US012618248B2

(12) United States Patent
Robertson et al.

(10) Patent No.: US 12,618,248 B2
(45) Date of Patent: May 5, 2026

(54) SUPPORT ELEMENT, SUPPORT STRUCTURE AND RELATED ASPECTS

(71) Applicant: MODDEX NZ LP, Rangiora (NZ)

(72) Inventors: Bruce John Robertson, Christchurch (NZ); Peter Douglas Hubbard, Christchurch (NZ); Jeremy Brayden Raikes, Rangiora (NZ)

(73) Assignee: MODDEX NZ Limited, Rangiora (NZ)

( * ) Notice: Subject to any disclaimer, the term of this patent is extended or adjusted under 35 U.S.C. 154(b) by 510 days.

(21) Appl. No.: 18/042,451

(22) PCT Filed: Aug. 20, 2021

(86) PCT No.: PCT/NZ2021/050142
§ 371 (c)(1),
(2) Date: Feb. 21, 2023

(87) PCT Pub. No.: WO2022/039605
PCT Pub. Date: Feb. 24, 2022

(65) Prior Publication Data
US 2023/0323681 A1     Oct. 12, 2023

(30) Foreign Application Priority Data

Aug. 21, 2020    (NZ) ........................................ 767353

(51) Int. Cl.
*F16M 11/00*        (2006.01)
*E04G 3/24*         (2006.01)
(Continued)

(52) U.S. Cl.
CPC ............... *E04G 5/045* (2013.01); *E04G 3/24* (2013.01); *E04G 5/006* (2013.01); *E04G 5/06* (2013.01); *F16M 13/02* (2013.01)

(58) Field of Classification Search
CPC ........... E04G 5/045; E04G 3/24; E04G 5/006; E04G 5/06; E04G 5/061; E04G 1/152;
(Continued)

(56) References Cited

U.S. PATENT DOCUMENTS 3,664,626 A * 5/1972 Sneller ..................... A47H 1/00
248/224.7
3,957,240 A 5/1976 Johansson
(Continued)

FOREIGN PATENT DOCUMENTS

KR    10-1000316    12/2010
KR    10-1305347    9/2013
(Continued)

OTHER PUBLICATIONS

International Search Report and Written Opinion issued in PCT/NZ2021/050142, dated Nov. 16, 2021.
(Continued)

*Primary Examiner* — Amy J. Sterling
(74) *Attorney, Agent, or Firm* — ARC IP Law, PC; Joseph J. Mayo

(57)        ABSTRACT

Described herein is a support element that may be a cantilever arm and a support structure being formed from multiple support elements for example to form a platform.
(Continued)

Methods of assembly and use are also described. In one aspect, a support element is described with an elongated shape, a distal end and a coupling end and a cantilever form, where the coupling end of the support element is configured to couple with a structural member, the support element further configured to rotate once coupled from an inclined or declined position to a substantially horizontal plane, the support element once rotated to a substantially horizontal plane, extending generally orthogonally away from the structural member to a termination point about the distal end of the support element.

30 Claims, 14 Drawing Sheets

(51) Int. Cl.

| | |
|---|---|
| *E04G 5/00* | (2006.01) |
| *E04G 5/04* | (2006.01) |
| *E04G 5/06* | (2006.01) |
| *F16M 13/02* | (2006.01) |

(58) Field of Classification Search

CPC .......... E04G 5/14; F16M 13/02; E01D 19/10; E01D 22/00; E01D 19/103

See application file for complete search history.

(56) References Cited

U.S. PATENT DOCUMENTS

| | | | | |
|---|---|---|---|---|
| 4,372,425 | A | 2/1983 | Murphy | |
| 5,005,801 | A | 4/1991 | Giarrocco et al. | |
| 5,738,319 | A * | 4/1998 | Grassi .................... | A47G 7/044 |
| | | | | 248/215 |
| 5,799,961 | A * | 9/1998 | Schmeets .................. | E06C 5/00 |
| | | | | 280/169 |
| 6,398,174 | B1 * | 6/2002 | Emalfarb ............... | A47G 7/044 |
| | | | | 248/295.11 |
| 7,354,023 | B1 * | 4/2008 | Wappler .................. | B25H 5/00 |
| | | | | 248/339 |
| 9,168,783 | B2 * | 10/2015 | Black ...................... | B60B 29/00 |

FOREIGN PATENT DOCUMENTS

| | | |
|---|---|---|
| KR | 10-1775645 | 9/2017 |
| WO | 9000657 | 1/1990 |

OTHER PUBLICATIONS

International Preliminary Report on Patentability issued in PCT/NZ2021/050142, dated Jul. 5, 2022.

Extended European Search Report issued in EP21858679 on Jan. 17, 2024 (8 pages).

* cited by examiner

SUPPORT ELEMENT, SUPPORT STRUCTURE AND RELATED ASPECTS

RELATED APPLICATIONS

This application claims priority from NZ767353 dated 21 Aug. 2020 with WIPO DAS code 57A9, the contents of which an incorporated herein.

TECHNICAL FIELD

Broadly described herein is a support element, support structure and related aspects. More specifically described herein is a support element that may be a cantilever arm and a support structure being formed from multiple support elements for example to form a platform. Methods of assembly and use are also described.

BACKGROUND

When assembling elevated structures there may be a need for support structures such as platforms alongside structural members like bridges, building beams and scaffolding. These support structures may be used to provide a platform (fixed or releasable), extend a structural member area, and/or to provide for additional support beyond the area of a structural member.

There may be a desire to increase, for example, the width of a bridge, or width of a scaffold platform, or width of a structural beam e.g. to provide a pedestrian or bicycle pathway; provide a wider scaffold platform for movement of people on the scaffold structure; or to provide a wider beam from which to hang services such as electrical lines, lighting, water lines, sprinklers and so on.

Existing methods of providing support structures of this nature typically require the process of fastening a support structure (fully or partly assembled) to the structural member using heavy lifting equipment, requiring extensive safety precautions including scaffolding and/or safety netting and/or or remote personnel lifting equipment during assembly. In a railway bridge scenario for example, installing a platform to one side of the railway bridge quickly becomes complex as: the bridge may be at significant heights above the ground; there are few existing supports to work from to build sideways; and there is a tension between needing to halt train traffic to complete the install but a desire to maintain normal operations as well to minimise disruption.

As may be appreciated from the above, a support element, support structure and related methods of assembly that minimise construction time and complexity may be of benefit or at least provide the public with a choice.

Further aspects and advantages of the above support element, support structure and related methods of assembly will become apparent from the ensuing description that is given by way of example only.

SUMMARY

Broadly, described herein is a support element in the form of a cantilever arm that can be used alone or with other support elements to form support structures. Assembly is a simple coupling and rotation process that avoids problems in the art and simplifies construction. The support element, related support structures and so on are versatile and can be used in a variety of applications.

In a first aspect, there is provided a support element with an elongated shape, a distal end and a coupling end and a cantilever form, the coupling end of the support element configured to couple with a structural member, the support element further configured to rotate once coupled from an inclined or declined position to a substantially horizontal plane, the support element once rotated to a substantially horizontal plane, extending generally orthogonally away from the structural member to a termination point about the distal end of the support element.

In a second aspect, there is provided a cantilever arm with an elongated shape, a distal end and a coupling end and a cantilever form, the coupling end of the cantilever arm configured to couple with a flanged beam on a bridge, building or scaffold, the cantilever arm further configured to rotate once coupled from an inclined or declined position to a horizontal plane, the cantilever arm once rotated to a horizontal plane, extending orthogonally away from the flanged beam to a termination point about the distal end of the cantilever arm.

In a third aspect, there is provided a plurality of support elements installed in series alongside a structural member to form a support structure alongside the structural member, each support element having an elongated shape, a distal end and a coupling end and a cantilever form, the coupling end of the support element configured to couple with a structural member, the support element further configured to rotate once coupled from an inclined or declined position to a substantially horizontal plane, the support element once rotated to a substantially horizontal plane, extending generally orthogonally away from the structural member to a termination point about the distal end of the support element; and optionally, a platform member located on some or all of the support elements.

In a fourth aspect, there is provided a plurality of cantilever arms installed in series alongside a flanged beam on a bridge, building or scaffold to form a platform alongside the bridge, building or scaffold, each cantilever arm having an elongated shape, a distal end and a coupling end and a cantilever form, the coupling end of the cantilever arm configured to couple with the flanged beam on a bridge, building or scaffold, the cantilever arm further configured to rotate once coupled from an inclined or declined position to a horizontal plane, the cantilever arm once rotated to a horizontal plane, extending orthogonally away from the flanged beam on a bridge, building or scaffold to a termination point about the distal end of the cantilever arm, and optionally a platform member or members selected from: gratings, plates, beams, battens, trays and combinations thereof, located on some or all of the cantilever arms.

In a fifth aspect, there is provided a structural member and associated support structure alongside the structural member formed from at least one support element, each support element with an elongated shape, a distal end and a coupling end and a cantilever form, the coupling end of the support element configured to couple with a structural member, the support element further configured to rotate once coupled from an inclined or declined position to a substantially horizontal plane, the support element once rotated to a substantially horizontal plane, extending generally orthogonally away from the structural member to a termination point about the distal end of the support element.

In a sixth aspect, there is provided a bridge, building or scaffold and associated platform alongside the bridge, building or scaffold formed from at least one cantilever arm, each cantilever arm with an elongated shape, a distal end and a coupling end and a cantilever form, the coupling end of the cantilever arm configured to couple with a flanged beam on the bridge, building or scaffold, the cantilever arm further configured to rotate once coupled from an inclined or declined position to a substantially horizontal plane, the cantilever arm once rotated to a substantially horizontal plane, extending generally orthogonally away from the bridge, building or scaffold to a termination point about the distal end of the cantilever arm.

In a seventh aspect, there is provided a method of providing a support structure to a structural member comprising coupling at least one support element to the structural member, each support element having an elongated shape, a distal end and a coupling end and a cantilever form, the coupling end of the support element configured to couple with a structural member, the support element further configured to rotate once coupled; and wherein the method comprises coupling the support element to a structural member about the coupling end of the support element, and then rotating the support element once coupled from an inclined or declined position to a substantially horizontal plane, the support element once rotated to a substantially horizontal plane, extending generally orthogonally away from the structural member to a termination point about the distal end of the support element.

In an eight aspect, there is provided a method of assembling at least one support element on a structural member, the method comprising the steps of:

providing a structural member;

providing at least one support element substantially as described above;

coupling the support element to a structural member about the coupling end of the support element;

rotating the support element once coupled from an inclined or declined position to a substantially horizontal plane;

the support element once rotated to a substantially horizontal plane, extending generally orthogonally away from the structural member to a termination point about the distal end of the support element.

In a ninth aspect, there is provided a method of disassembling at least one support element from a structural member, the method comprising the steps of:

providing a structural member with at least one support element substantially as described above, the at least one support element coupled at the coupling end of the support element to the structural member and extending in substantially horizontal plane and generally orthogonally away from the structural member to a termination point about the distal end of the support element;

rotating the at least one support element from the horizontal plane position to an inclined or declined position, the support element rotating about a coupling on the structural member;

uncoupling the at least one support element from the structural member.

As may be appreciated from the above, one advantage of the support element, support structure and related aspects noted may be to rapidly widen a structural member such as a bridge platform. Further aspects and advantages of the support element, support structure and related methods of assembly will become apparent from the ensuing description that is given by way of example only.

BRIEF DESCRIPTION OF THE DRAWINGS

Further aspects of the support element, support structure and related methods of assembly will become apparent from the following description that is given by way of example only and with reference to the accompanying drawings in which.

DETAILED DESCRIPTION

Figure 1:
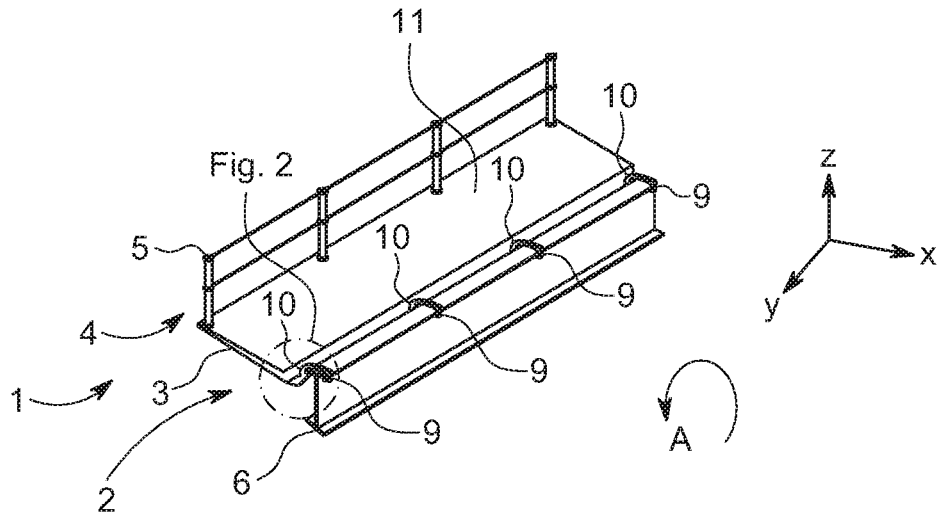
FIG. 1 illustrates a perspective view of a first embodiment of support element and support structure coupled to a structural member.

As noted above, described herein is a support element in the form of a cantilever arm that can be used alone or with other support elements to form support structures. Assembly is a simple coupling and rotation process that avoids problems in the art and simplifies construction. The support element, related support structures and so on are versatile and can be used in a variety of applications.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'cantilever' or grammatical variations thereof refers to a substantially rigid support element which extends in a substantially horizontal plane and is supported at only one end by coupling to a structural member.

The term 'rotation' or grammatical variations thereof in the context of the support element refers to the end or a part of the support element being configured to rotate from an inclined or declined of substantially vertical plane to a substantially horizontal plane. The extent of rotation maybe from 10-90 degrees.

The term 'stop' or grammatical variations thereof in the context of the support element refers to a point at which rotation is no longer possible due to a part or parts interfering to physically block further movement

A Support Element

In a first aspect, there is provided a support element with an elongated shape, a distal end and a coupling end and a cantilever form, the coupling end of the support element configured to couple with a structural member, the support element further configured to rotate once coupled from an inclined or declined position to a substantially horizontal plane, the support element once rotated to a substantially horizontal plane, extending generally orthogonally away from the structural member to a termination point about the distal end of the support element.

The support element may be a cantilever arm.

Structural Member

The structural member may be a beam. The beam may in one embodiment have a planar form and opposing faces. In one embodiment, the beam may have flanges. The beam may have a flanged top. In specific embodiments, the beam may be an I-shaped cross section beam (termed I-beam hereafter) or a T-shaped cross section beam (term a T-beam hereafter). Such beam shapes are widely used in construction due to their simple forming process e.g. as an extrusion and their comparative strength particularly against point loads on the beam length. These flanged forms may not be essential but may be useful shapes to complement a cantilever coupling as they inherently have a wider cross-section top and narrow cross-section body about which to clamp.

The structural member beam may be a beam on a wider structure, the wider structure being for example a bridge, building or scaffold. These embodiments are described further below however the same principle could be used from other elevated structures e.g. a dam wall.

The structural member may be a bridge. In this embodiment, the support element(s) extend in a generally orthogonal direction away from the bridge side and collectively may form a support structure alongside the bridge. The bridge may be trafficked by rail, vehicles, pedestrians, or other conveyance. In one embodiment, the support element(s) and support structure may be used to allow egress of people and goods from a train stopped on a bridge for example, where a train breaks down or otherwise halts on a rail bridge. The support element(s) and support structure may also be used as so-called clip-on lanes to existing bridges such as pedestrian bridges and the like to widen the bridge and for example, allow for greater traffic across a bridge. The support structure in this embodiment may be a platform designed to support people, goods or vehicles, the exact nature of the conveyance being design dependent.

The structural member may instead be a beam used to construct a building. The beam may be part of the building skeleton structure. In this example, the support element(s) and support structure may extend sideways from the beam and provide a support such as a tray support for service lines such as power, water, telecommunications and the like about a building roof. Alternatively, the support element(s) and support structure may form a platform (temporary or permanent) for people or goods to traverse at a point elevated above the ground.

The structural member may further be a scaffold extension. Scaffolding is widely used in construction to allow safe access to building structures at heights. Scaffolding is widely configurable into many shapes and forms. It may be useful to provide a wider platform to an existing scaffold section using the support element(s) and support structure described.

Cantilever Form

As noted above, each support element is effectively a cantilever, a coupling end of a support element being linked to a structural member and extending away from the structural member to a distal end.

Extension of the support element may be in a direction generally orthogonal to the longitudinal axis of the structural member.

When installed, the support element experiences a turning moment about the coupling. The turning moment increases as a force is applied to the top of the support element and the turning moment progressively increases as the force applied moves outwards from the coupling to a maximum loading about the distal end point of the support element.

Coupling

As noted above, the support element couples to the structural member about a coupling at the coupled end of the support element.

The coupling end may be formed to have opposing jaws, the jaws clamping together to secure the support element to structural member.

In one embodiment, the opposing jaws may have a generally C-shape cross section form. The C-shape top jaw may extend over a part or all of the structural member, in one embodiment extending over the structural member to grip or bear on a far side or portion of the structural member. The C-shape lower jaw may grip or bear on a near side or portion of a structural member. In one embodiment where the structural member or part thereof is a flanged beam, the C-shape top jaw may extend over a flange on a far side of the support element when coupled and the opposing jaw may extend under a near side flange when the support element is coupled. In the above embodiment, the jaws may cooperate to allow rotational movement of the support element up to a point and then act as a stop to prevent further rotational movement. This stop to further movement may coincide with the support element being in a substantially horizontal plane. Typically this stop results from the near side jaw bearing on or interfering with the beam or beam flange preventing further rotational movement. In concert with the near side jaw interfering with the beam may be the far side jaw also interfering with or striking the beam or beam flange also preventing further rotational movement of the support element.

One or both jaws may move towards the opposing jaw. Movement may be in stages or an infinite number of positions. In practice, the jaws may be fitted to a first position sufficient to fit over the structural member and partly couple the support element and structural member but not so tight as to prevent rotation. In this first position, the support element may be in an inclined or declined position relative to a horizontal plane. Once rotated and installed to a horizontal plane position, the support element jaws may be fully tightened to a second locked position to fix the support element in place and prevent reverse rotation to an inclined or declined position again. The second position may be reversed to a first position by uncoupling the jaws and rotating the support element to an inclined or declined position—that is the process of coupling may be reversible. This may be useful to allow for fitting in a loose configuration relative to the structural member shape and subsequent clamping by jaw contraction once in position. Reversible fitting may also be useful to allow for re-positioning of the support elements and/or removal in the case of a temporary placement.

Jaw movement may be actuated via a fastener, lever, or other mechanical means. Alternatively, motors or other electronic or electrical means could also be used to actuate jaw movement.

Whilst not essential, additional fasteners such as bolts and screws may be used to further lock in place a support element or support elements once installed.

At least two fasteners may be used at structurally critical locations to provide redundancy in case of one fastener failure.

The coupling may comprise a torque limiter or torque indicator. This may be provided to allow an installer to gauge how tight to couple the support element to the structural member. In one embodiment the torque limiter allows a threaded fastener being tightened to slip and not tighten further once a required torque is reached. In another embodiment, when a desired torque is reached, a noise or visual indicator may indicate that desired torque has been reached. Torque may be measured via for example by the extent of fastener travel and/or the clamp force between the jaws.

Rotation

Rotation of the support element as described above may be about a vertical plane. The rotation axis may be a point on or about the coupling end of the support element. Rotation may be in a direction generally orthogonal to the structural member. The structural member may have an elongated axis and the support element may extend orthogonally away from the elongated axis of the structural member.

The extent of rotation possible once the support element is coupled to the structural member may be less than 90, or 85, or 80, or 75, or 70, or 65, or 60, or 55, or 50, or 45, or 40, or 35, or 30, or 25 degrees. That is, the support element may rotate once coupled from an inclined or declined position relative to the structural member to a generally horizontal plane. The sweep of the support element as it lowers or rises may be less than the angles stated previous i.e. the support element is coupled to the structural member at a right angle extending generally 90 degrees to the coupling end of the support element and rotation axis. The support element may then be then lowered or raised to a generally horizontal plane, or around 0 degrees, and the distal end of the support element or points along the support element length prescribe a 90 degree arc through the air as rotation occurs. 90 degrees is used by way of example and more acute angles may also occur.

Substantially Horizontal Plane

For ease of reading, the phrase 'substantially horizontal plane' is used throughout this specification when referring to the final installed position of a support element relative to a structural member. As noted above, the term 'substantially' may infer some degree of variability in the angle of the support element from a purely 0 degree flat horizontal plane to other angles somewhat offset from 0 degrees. Some degree of variability may be designed for such as to allow for drainage of rain water from the support element(s) and items thereon; to allow items to run to one end or the other of the support element and items thereon e.g. run or move through gravity to a low point.

In one embodiment, the support element(s) may be angled slightly towards the structural member for example, to urge people on the support element(s) to move towards the structural member.

Generally Orthogonally Away

For ease of reading, the phrase 'generally orthogonally away' is used throughout this specification when referring to the final position of a support element relative to a structural member when in a horizontal plane. That is to say, the structural member may be a beam on a bridge, building or scaffold with an elongated form and elongation axis. The term 'generally orthogonally away' refers to the support elements extending at an angle of 90 degrees relative to this beam longitudinal axis. In this context it should be noted that generally orthogonal is not limited to a 90 degree angle and the angle may be substantially orthogonal. Support elements may for example extend at a slight angle relative to an orthogonal direction e.g. at 85, or 80, or 75, or 70, or 65, or 60 degrees relative to the structural member longitudinal axis.

Support Element Construction

In a second aspect, there is provided a cantilever arm with an elongated shape, a distal end and a coupling end, the coupling end of the cantilever arm configured to couple with a flanged beam on a bridge, building or scaffold, the cantilever arm further configured to rotate once coupled from an inclined or declined position to a horizontal plane, the cantilever arm once rotated to a horizontal plane, extending orthogonally away from the flanged beam to a termination point about the distal end of the cantilever arm.

Support Structure Made of Multiple Support Elements

In a third aspect, there is provided a plurality of support elements installed in series alongside a structural member to form a support structure alongside the structural member, each support element having an elongated shape, a distal end and a coupling end and a cantilever form, the coupling end of the support element configured to couple with a structural member, the support element further configured to rotate once coupled from an inclined or declined position to a substantially horizontal plane, the support element once rotated to a substantially horizontal plane, extending generally orthogonally away from the structural member to a termination point about the distal end of the support element: and optionally, a platform member located on some or all of the support elements.

Platforms

As may appreciated from the above aspect, multiple support elements may be combined together to form a support structure such as a platform. Platforms may in one embodiment may formed by placing separate platform members onto support elements either after coupling to the structural member or, before coupling. Alternatively, platform members may be prefabricated into or on the support elements so that, once the support elements are installed, platform members are already present.

In one embodiment the platform members may be planar in form. The platform members may be separate or integrated gratings, plates, beams, battens, trays and combinations thereof.

As may be appreciated, the support elements extending orthogonally from the structural member and hence the support structure may be formed alongside the structural member extending along or parallel to the structural member longitudinal axis.

The support structure described may be used to convey items thereon e.g. people, goods, vehicles, cycles scooters, service lines and so on.

In one embodiment, one platform, for example a grating, may be laid onto 2-10 support elements to bridge the gap between spaced apart support elements. Multiple platforms may be laid across multiple support elements either spaced apart width wise along the support element width or spaced at intervals along the support structure length (made up of multiple support elements).

Support elements may comprise a means to fix a platform to the support element. For example, a support element may comprise nesting features that receive and complement the platform shape thereby wedging or otherwise retaining in place platforms once fitted.

Fasteners may also be used to fit the platform(s) to the support element(s).

In one embodiment, the support elements may have receiving brackets that accept and retain (at least partially) a platform such as a grating placed therein. The receiving brackets may for example be angled brackets that nest the platform side(s). Openings may be located in the receiving brackets to allow a fastener to pass through and link the receiving bracket and platform.

Platform Construction

In a fourth aspect, there is provided a plurality of cantilever arms installed in series alongside a flanged beam on a bridge, building or scaffold to form a platform alongside the bridge, building or scaffold, each cantilever arm having an elongated shape, a distal end and a coupling end and a cantilever form, the coupling end of the cantilever arm configured to couple with the flanged beam on a bridge, building or scaffold, the cantilever arm further configured to rotate once coupled from an inclined or declined position to a horizontal plane, the cantilever arm once rotated to a horizontal plane, extending orthogonally away from the flanged beam on a bridge, building or scaffold to a termination point about the distal end of the cantilever arm; and optionally, a platform member or members selected from: gratings, plates, beams, battens, trays and combinations thereof, located on some or all of the cantilever arms.

Structural Member with Support Structure and Support Elements

In a fifth aspect, there is provided a structural member and associated support structure alongside the structural member formed from at least one support element, each support element with an elongated shape, a distal end and a coupling end and a cantilever form, the coupling end of the support element configured to couple with a structural member, the support element further configured to rotate once coupled from an inclined or declined position to a substantially horizontal plane, the support element once rotated to a substantially horizontal plane, extending generally orthogonally away from the structural member to a termination point about the distal end of the support element.

Structural Member Construction

In a sixth aspect, there is provided a bridge, building or scaffold and associated platform alongside the bridge, building or scaffold formed from at least one cantilever arm, each cantilever arm with an elongated shape, a distal end and a coupling end and a cantilever form, the coupling end of the cantilever arm configured to couple with a flanged beam on the bridge, building or scaffold, the cantilever arm further configured to rotate once coupled from an inclined or declined position to a substantially horizontal plane, the cantilever arm once rotated to a substantially horizontal plane, extending generally orthogonally away from the bridge, building or scaffold to a termination point about the distal end of the cantilever arm.

A Method of Providing a Support Structure to a Structural Member

In a seventh aspect, there is provided a method of providing a support structure to a structural member comprising coupling at least one support element to the structural member, each support element having an elongated shape, a distal end and a coupling end and a cantilever form, the coupling end of the support element configured to couple with a structural member, the support element further configured to rotate once coupled; and wherein the method comprises coupling the support element to a structural member about the coupling end of the support element, and then rotating the support element once coupled from an inclined or declined position to a substantially horizontal plane, the support element once rotated to a substantially horizontal plane, extending generally orthogonally away from the structural member to a termination point about the distal end of the support element.

Method of Assembly

In an eight aspect, there is provided a method of assembling at least one support element on a structural member, the method comprising the steps of:

providing a structural member;

providing at least one support element substantially as described above;

coupling the support element to a structural member about the coupling end of the support element;

rotating the support element once coupled from an inclined or declined position to a substantially horizontal plane;

the support element once rotated to a substantially horizontal plane, extending generally orthogonally away from the structural member to a termination point about the distal end of the support element.

Method of Disassembly

In a ninth aspect, there is provided a method of disassembling at least one support element from a structural member, the method comprising the steps of:

providing a structural member with at least one support element substantially as described above, the at least one support element coupled at the coupling end of the support element to the structural member and extending in substantially horizontal plane and generally orthogonally away from the structural member to a termination point about the distal end of the support element;

rotating the at least one support element from the horizontal plane position to an inclined or declined position, the support element rotating about a coupling on the structural member;

uncoupling the at least one support element from the structural member.

Assembly

Assembly of the support element to a structural member may be achieved by locating the support element coupling on a point of the structural member to which the support element is to be installed and lowering or raising by rotation about the coupling end, the support element until the support element reaches a generally horizontal plane.

Inherent to this method of installation and as described above in earlier aspects, is the need to initially have the support element rotated about a vertical plane at an angle offset from a horizontal plane. As the support element rotates, the coupling stops or interferes with rotation relative to the structural member and rotation beyond a horizontal plane by the support element is prevented by interference between the coupling and the structural member.

This method of assembly has the advantage of allowing for installation from above the structural member. During rotation, the support element is at least partially supported on the structural member about the axis of rotation (on or about the coupling). This ability to install from above offers numerous advantages to installation. For example, the danger to people during installation is minimised by avoidance of working at heights since the equipment used and people needed can be located on a stable platform on the structural member. Installation occurs quickly hence disruption is minimised. Scaffold alongside the structural member may not be necessary reducing cost and time. This is a particularly challenging problem when installing support structures alongside bridges elevated high above the ground and where scaffolding needs to hang or extend below the bridge.

In one embodiment, once rotated to a horizontal plane, a support element may be sufficiently stable to support a load thereon. This may allow a worker to move onto the support element and lock the support element via the coupling to the structural member and/or to fit a platform onto the support element.

Through careful design, a support element may have a weight that is low enough to be handled by one or two people or which may be maneuvered using light weight lifting equipment. This may further reduce the time needed to install the support structure, reduce installation costs and minimise disruption to normal use of the structural member e.g. passage of traffic.

Support Element Parts

A support element may be formed in multiple parts. As noted above, a support element may comprise:

a coupling end that has a coupling to link the support element to a structural member;

an arm extending from the coupling end; and a distal end.

In one embodiment, the coupling end may comprise a top member, an inner clamp or jaw, a outer clamp or jaw, a saddle, one end of the arm and a fastening mechanism. In this embodiment the arm end, clamps and top member link together and are covered by the saddle. The fastening mechanism may comprise a threaded plate, the plate fixed in the top tube and a fastener threaded through the plate opening and into the outer clap. As the fastener is tightened, the outer clamp is moved towards the opposing clamp and the clamps tighten about the structural member. As the fastener is untightened, the outer clamp moves away from the opposing clamp and the grip on the structural member loosens. In one embodiment the outer clamp moves part way towards the inner clamp to couple the support element to the structural member but still has enough spacing to allow the support element to rotate. Once the support element is rotated and in a horizontal plane, the outer clamp may be fully tightened to prevent rotational movement in the reverse direction.

As may be appreciated, the way the jaws are formed and tightened may be achieved in a number of ways and the above embodiment is provided by way of example only.

The arm itself may be formed as a steel box-section or from separate parts joined together (e.g. via welding) to form a box shape cross-section. A box shape may offer benefits in terms of structural strength and stiffness and is a common form of steel shape available for purchase. Formation however from different parts to a box shape may also offer benefits in terms of easier transport pre-assembly (e.g. flat parts that are more compact for shipping). Assembly in this manner may also help to avoid compromise of surface coatings e.g. galvanising or painting by allowing the chance to provide a surface coating on the assembled parts and not only before assembly.

Handrail or Handrail Support

A support element may comprise a handrail or handrail supporting structure. This handrail or handrail supporting structure may be located about the distal end of the support element. The handrail may link multiple support elements about the distal ends of the support elements.

The handrail supporting structure may be a stanchion. The stanchion may be a separate part or be integral to the support element. The handrail supporting structure may connect to the distal end of the support element. Connection may be via a male/female sleeve arrangement with the stanchion fitting over (female) the distal end (male) of the support element. The stanchion may have a sleeve, the sleeve sized to complement and nest a handrail post. The sleeve may be directed generally orthogonal to and in a vertical plane, relative to the support element when in a horizontal plane position. This may be to allow the use of straight handrail posts. The stanchion may be fixed to the support element via one or more fasteners. The handrail post may be fixed to the stanchion through friction and/or through use of one or more fasteners.

Support Element Construction

A support element may be prefabricated off site as needed. This may be useful to allow for greater production precision and accuracy and may minimise installation time on site. Depending on the final design requirements, the support elements may be sufficiently small and light to easily be transported to a site and moved from transport to an installation location. In embodiments envisaged by the inventors, support elements may weigh less than 30 kg.

Support Element Size

In one embodiment, each support element may be relatively narrow in width. A support element may be approximately 50 mm wide. This width may be relatively consistent or the same along the support element length.

Each support element may extend approximately 0.5, or 0.6, or 0.7, or 0.8, or 0.9, or 1.0, or 1.1, or 1.2, or 1.3, or 1.4, or 1.5, or 1.6, or 1.7, or 1.8, or 1.9, or 2.0 metres from the structural member.

Each support element may be approximately 100 to 200 mm deep. This depth may be relatively consistent along the support element length.

Part, or most, or all, of the support element may have a rectangular cross-section shape formed as a box section or formed from separate parts to a box shape. Other shapes and forms e.g. an I-beam or triangular section may be used and reference to a box shape should not be seen as limiting.

Damping Member

Optionally, a support element or elements may further comprise a damping member. Damping members envisaged comprise hydraulic or pneumatic cylinders, springs or other bias members to dampen oscillation or vibration. Damping members may be used in cooperation with the support elements to reduce or remove bouncing or movement of the support element or elements. By way of example, a longer support element with a slim profile may have a degree of flex. When multiple support elements are aligned and used to form a platform and goods or people placed on the platform, the support element(s) may flex and potentially bounce or oscillate e.g. through movement of people walking on the platform. Damping members may reduce the amount of flex or reduce the rate of flex, and hence provide a more stable surface. Damping members may be an alternative to use of reinforced and/or higher strength support elements and hence may reduce overall support element weight and material volume/cost.

Advantages

The above described support element, support structure, structural members and methods may provide a number of benefits.

Some selected benefits may include one or more of the following:

Provision of support structures (temporary or permanent) alongside structural members;

Retrofit or new installation of these support structures allowing versatility of use;

provision of sufficient structural strength to support design needs e.g. conveyance of people, goods, vehicles;

Light weight prefabrication;

Simple installation with greater safety;

Avoidance of welding. No welding is required onsite or between the support element, support structure and structural member. This saves considerable time and expense on installation;

Minimisation of disruption of structural member use;

Installation from above lowering the risk of safety issues for workers and minimising or avoiding use of scaffolding and lifting equipment.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described support element, support structure and related aspects are now described by reference to specific examples.

Example 1

In this example, a first embodiment of support element and support structure is shown coupled to a structural member. For ease of reference, in this example, the support element is an arm, the support structure is a platform made up of multiple arms and the structural member is an I-beam as might be used in a bridge, building or other elevated structures.

Figure 2:
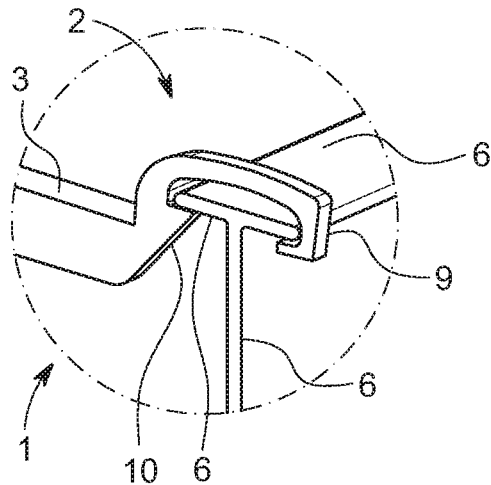
FIG. 2 illustrates a detail perspective view of the above first embodiment and the support element and structural member coupling.
Figure 3:
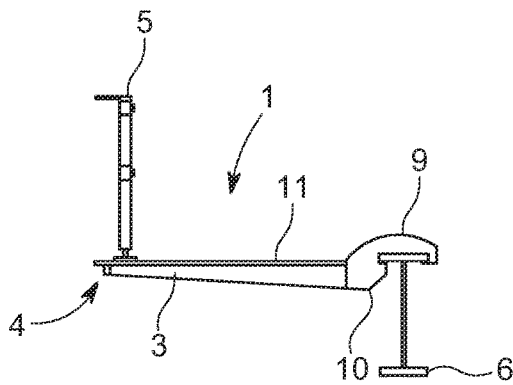
FIG. 3 illustrates a side view of the above first embodiment and the support element and support structure coupled to a structural member.

FIG. 1 shows a perspective view of the first embodiment of a platform 11 assembled from multiple arms 1 in an installed position i.e. with the arms in a substantially horizontal plane. FIG. 2 shows the same embodiment and position however focused on the coupling region between the arm 1 and an I-beam 6. FIG. 3 shows an end on view of the same first embodiment in an installed position.

Arms 1 extend orthogonally (at right angles) from the I-beam 6 and a platform in the form of a planar structure 11 lies on the arms 1 to provide a support on which people or objects (not shown) may stand or be supported on. The arms 1 as shown comprise a coupling end generally shown by arrow 2, a distal end 4 and an arm 3 intermediate the ends. The coupling 2 links the arms 1 to the I-beam 6. The coupling 2 may comprise opposing jaws 9, 10. In this example, the jaws 9, 10 comprise and upper jaw 9 that extends over the top of the I-beam 6 and grip a far flange (inner side) when in the assembled position shown in FIG. 1. The coupling 2 also comprises a lower jaw 10 that fits under the outer flange of the I-beam 6. Together the jaws 9, 10 grip the I-beam 6 upper flanges and prevent the arms 1 from rotating about arrow A beyond the illustrated horizontal plane shown as label X. Also as shown, the platform 11 may comprise a handrail 5. The handrail 5 is attached to a distal end 4 of the arms 1.

In this example, an arm 1 may be manufactured from steel and be approximately 50 mm wide and extend approximately 2 metres from the I-beam 6. The arm may be approximately 100 to 200 mm deep. Based on the inventor's experience, this size and design may be sufficient to withstand a point load on the distal end 4 of the arm equivalent to approximately 10 people or around 7200 N. These dimensions and point load are noted by way of example only and it should be appreciated that the dimensions, material used and load limit may be highly variable and dictated by the desired design criteria. The coupling 2 may be manufactured from solid steel.

1=arm, 2=coupling, 3=arm portion, 4=distal end of arm, 5=handrail, 6=I-beam, 9=top jaw, 10=bottom jaw, 11=planar structure, X=horizontal plane, A=direction of turning moment/rotation of arm during installation.

Example 2

In this example, a second embodiment of support element, support structure and structural member is illustrated with reference to FIGS. 4, 5, 6, and 7. Again, for ease of reference, the support element in this example is referred to as an arm, the support structure is a platform made up of multiple arms, and the structural member is an I-beam as might be used in a bridge, building or other elevated structures.

Figure 4:
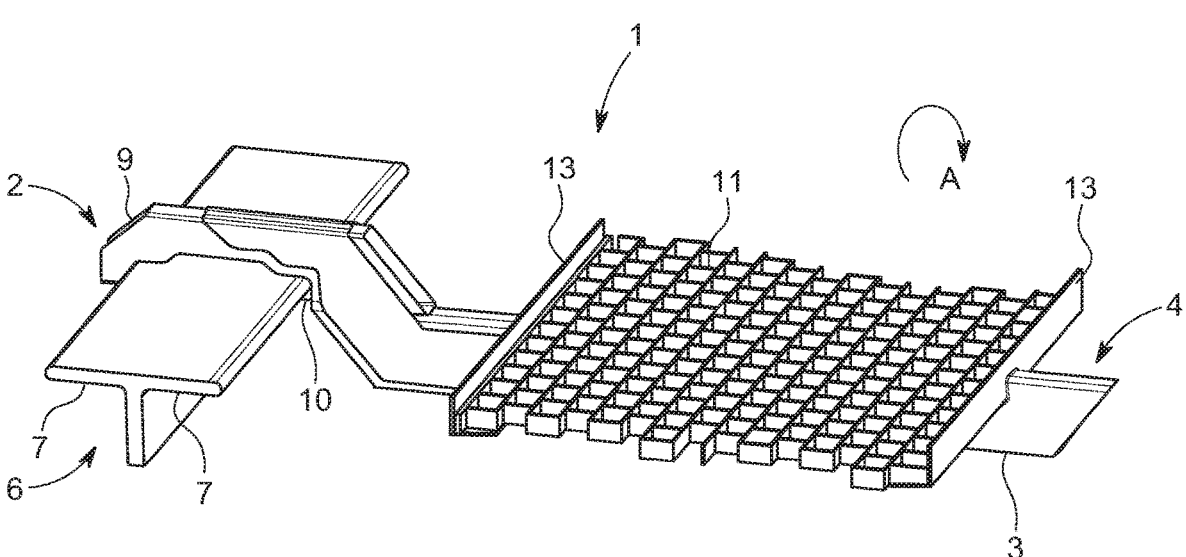
FIG. 4 illustrates a perspective view of a second embodiment of support element and support structure coupled to a structural member.
Figure 5:
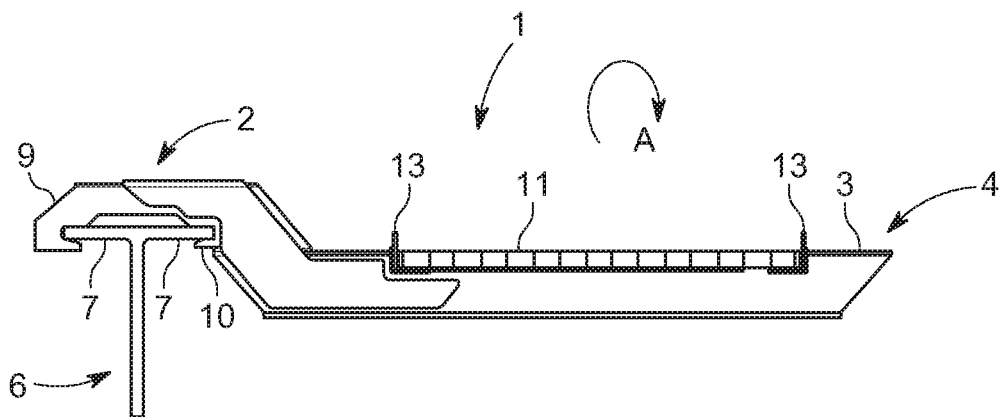
FIG. 5 illustrates a side view of the second embodiment of the support element and support structure coupled to a structural member.
Figure 6:
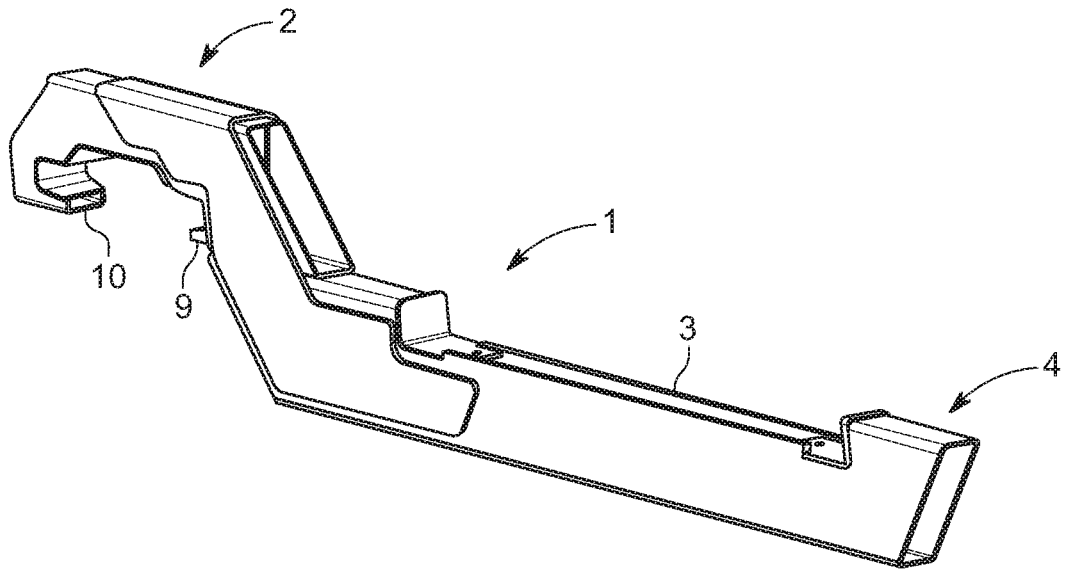
FIG. 6 illustrates a perspective view from above and in front of a support element alone according to the second embodiment.
Figure 7:
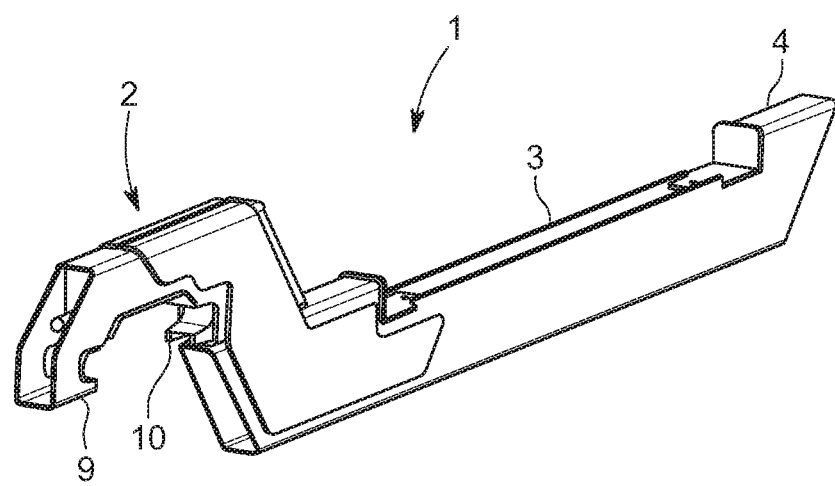
FIG. 7 illustrates a perspective view from above and behind of a support element alone according to the second embodiment.

FIG. 4 illustrates a perspective view of a second embodiment of arm 1 and platform 11 thereon coupled to the top portion of an I-beam 6. FIG. 5 illustrates a side view of the same second embodiment. FIG. 6 illustrates a perspective view from above and in front of the arm 1 alone and FIG. 7 illustrates a perspective view from above and behind of the arm 1 alone.

As shown in FIGS. 4-7, the structural member 6 is an I-beam 6 having flanges extending from a central vertical planar portion. In FIG. 4 and FIG. 5, only the top portion of the I-beam 6 is shown. These drawings also illustrate how the same arm 1 may be coupled to a T-shaped beam 6 in that only the top flanged portions may be used for coupling of the arm 1 to the beam 6.

The arm 1 extends orthogonal to the beam 6 length once installed, the installed position shown in FIGS. 4 and 5. The arm 1, like Example 1, comprises a coupling portion 2, an arm portion 3 and a distal end 4.

The platform 11 in this example being a grating is placed and fixed onto the arm 1. Retaining clamps 13 on the arm 1 may be used to retain the grating 11 to the arm 1.

As may be seen in FIGS. 4-7 the jaws 9, 10 shown clamp in this example about a horizontal plane, each jaw 9, 10 located on either side of a C-shape joint. In this example, the outer jaw 9 remains fixed in place while the inner jaw 10 may move in a reciprocal manner back and forth along an axis parallel to the arm 1 longitudinal length. Movement of the inner jaw 9 may be actuated via a fastener (not shown).

Support element/arm=1, Coupling=2, Arm portion=3, Distal end=4, Structural member=I-beam on a bridge=6, I beam flanges=7, Inner jaw=9, Outer jaw=10, Turning moment=arrow A, Platform=11, Platform nesting portion=13

Example 3

As noted in the above description, the support structure may comprise a handrail or other barrier to the support structure edge.

Figure 8:
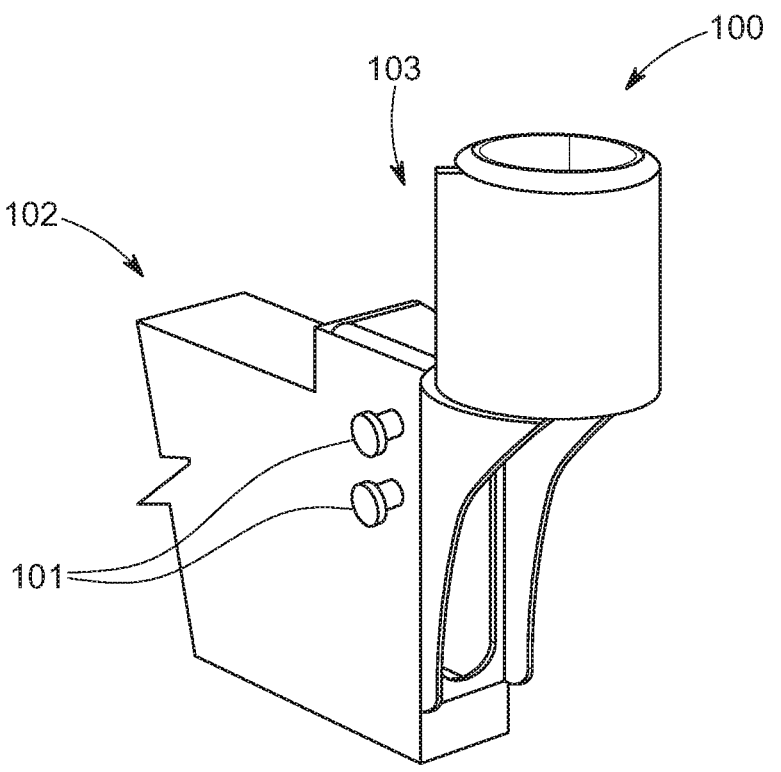
FIG. 8 illustrates perspective view of a stanchion embodiment.

FIG. 8 illustrates one example of a means to connect a support element to a handrail, in this case via a stanchion 100. The stanchion 100 may connect to the distal end 103 of the support element 102. Connection may be via a male/female sleeve arrangement with the stanchion 100 fitting over (female) the distal end 103 (male) of the support element 102. The stanchion 100 may have a round sleeve with an opening at 90 degrees to the connection between the support element 102 and stanchion 100. The round sleeve may be sized to complement and nest a handrail post (not shown). The round sleeve may be directed generally orthogonal and in a vertical plane relative to the support element 102 when in an installed horizontal plane position. This may be to allow the use of straight handrail posts. The stanchion 100 may be fixed to the support element 102 via one or more fasteners 101. The handrail post (not shown) may be fixed to the stanchion 100 through friction and/or through use of one or more fasteners (not shown).

Stanchion or sleeve=100, Fasteners=101, Support element=arm portion=102, Distal end of arm=103

Example 4

FIGS. 9-18 illustrate a third embodiment. As before, the support element in this example is referred to as an arm, the support structure may be a platform (not shown) made up of multiple arms 50, and the structural member 54, 54a is an I-beam as might be used in a bridge, building or other elevated structures.

Figure 9:
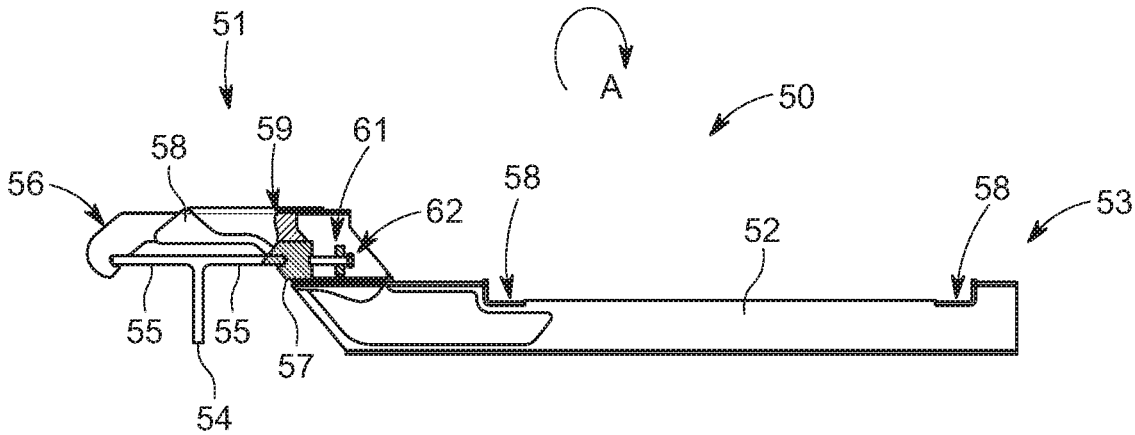
FIG. 9 illustrates a side view of a third embodiment of support element and support structure coupled to a structural member with a section of the coupling area sectioned to show internal coupling details.
Figure 10:
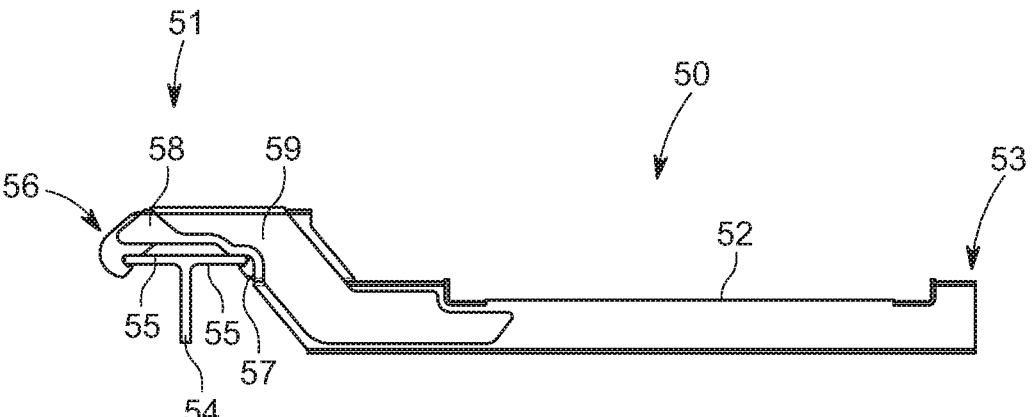
FIG. 10 illustrates a side view of the third embodiment of support element and support structure coupled to a structural member with no sectioning.
Figure 11:
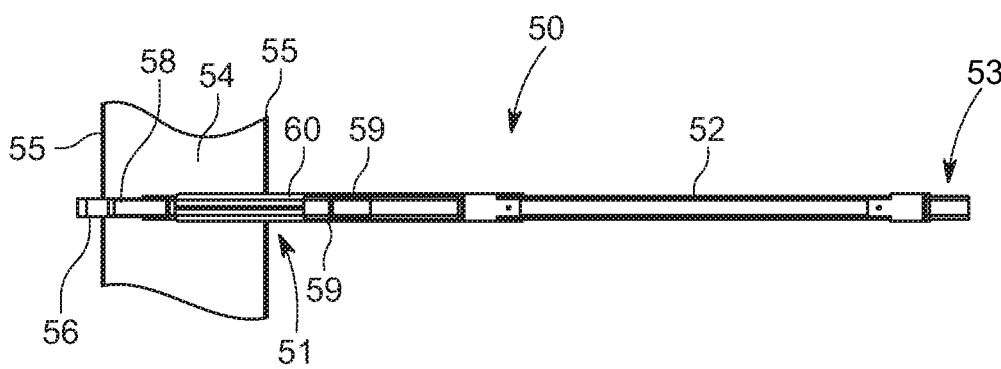
FIG. 11 illustrates a view from above of the third embodiment of support element and support structure coupled to a structural member.
Figure 12:
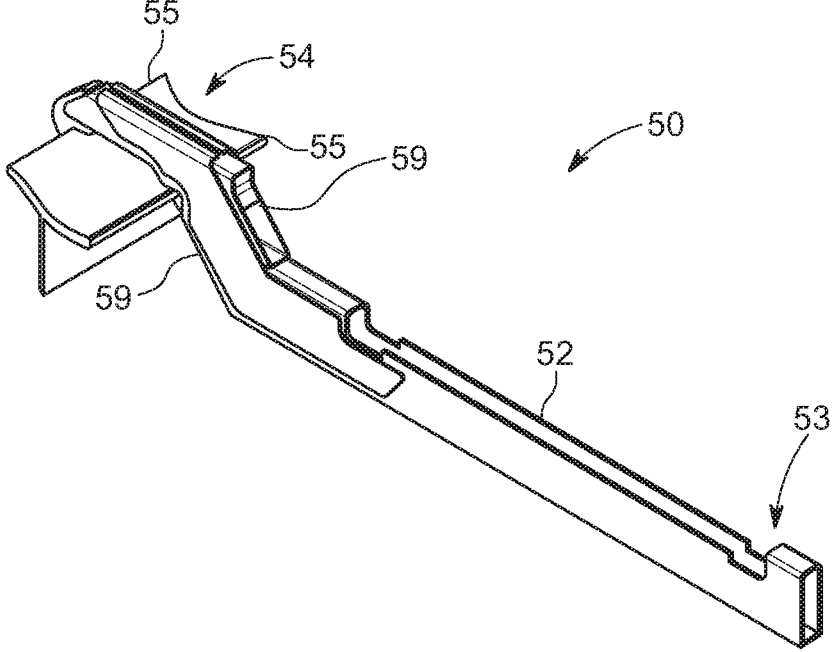
FIG. 12 illustrates a perspective view from above and in front of the third embodiment of support element and support structure coupled to a structural member
Figure 13:
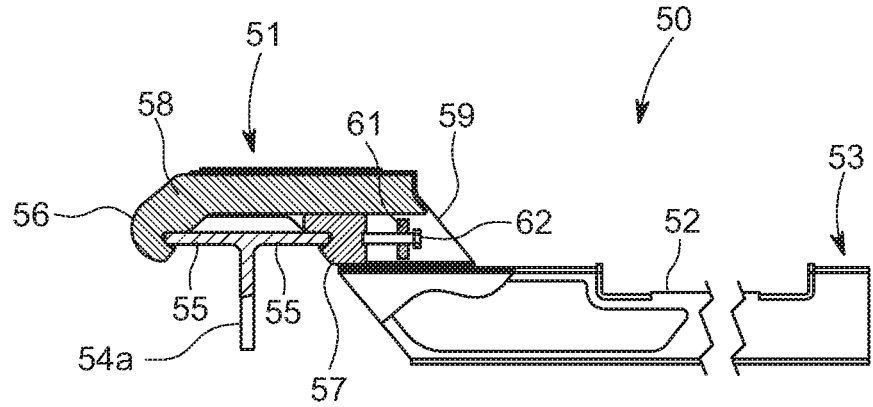
FIG. 13 illustrates a cross section side view of the third embodiment detailing the support element coupling and structural member.

FIG. 9 illustrates a side view arm 50 and platform coupled to a beam 54, 54a with a section of the coupling 51 area sectioned to show internal coupling details. FIG. 10 illustrates the same side view with no sectioning. FIG. 11 illustrates the same assembly viewed from above. FIG. 12 illustrates a perspective view from above and in front of the same assembly. FIG. 13 illustrates a further cross section side view of the same assembly further detailing the arm 50 coupling and beam 54, 54a.

FIGS. 14 to 18 illustrate view of different individual parts that may be used to form an arm 50.

As best seen in FIGS. 9 to 13, the arm 50 is similar in form to that described in Example 2 with a coupling end 51, arm portion 52 and distal end 53. The arm 50 is shown coupled to the top portion of an I-beam 54, 54a (or T-beam). In FIG. 9 the arm 50 is coupled to a larger width I-beam 54 and in FIG. 10 the arm 50 is coupled to a smaller width I-beam 54a. As may be appreciated, the arm 50 may be coupled to varying size and shaped structural members.

As best seen in the section views of FIGS. 9 and 13, the coupling comprise an fixed outer jaw 56 and a moving inner jaw 57. The jaws 56, 57 oppose each other about a common horizontal plane. Movement of the inner jaw 57 may be actuated in the embodiment shown using a threaded fastener 62 linked to the inner jaw 57. As the fastener is actuated, the inner jaw 57 is moved towards or away from the outer jaw 56. The fastener may be located in place using a threaded plate 61.

Figure 14:
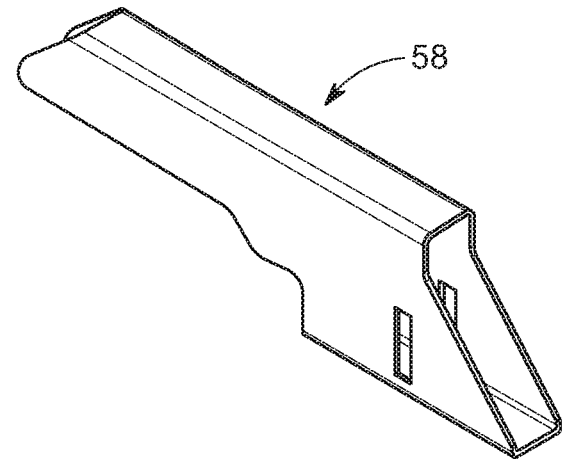
FIG. 14 illustrates a perspective view of a top tube used to form part of the support element in the third embodiment.
Figure 15:
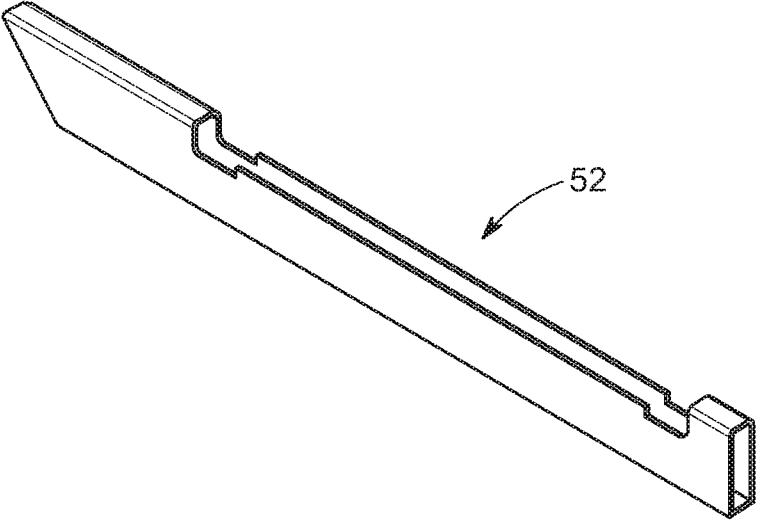
FIG. 15 illustrates a perspective view of an arm used to form part of the support element in the third embodiment.
Figure 16:
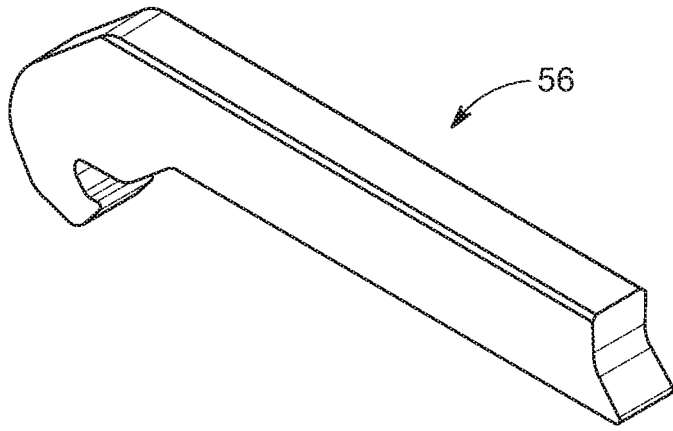
FIG. 16 illustrates a perspective view of an inner clamp used to form part of the support element in the third embodiment.
Figure 17:
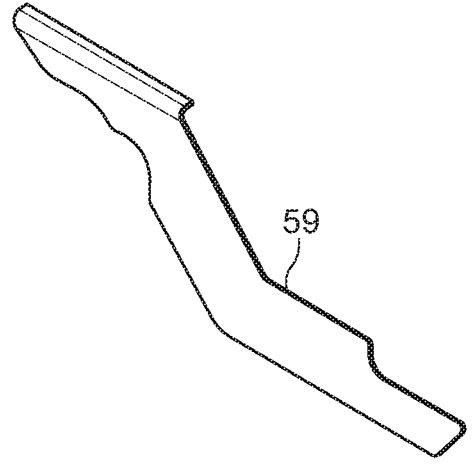
FIG. 17 illustrates a perspective view of a left hand side saddle used to form part of the support element in the third embodiment.
Figure 18:
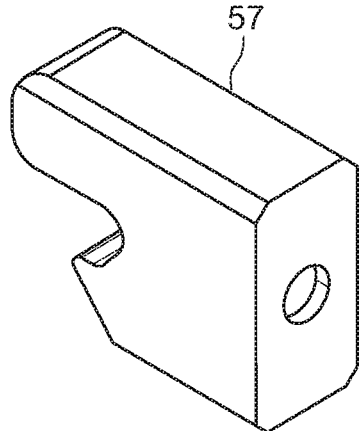
FIG. 18 illustrates a perspective view of an outer clamp used to form part of the support element in the third embodiment.

FIG. 14 shows an example of a top tube 58 used to form a part of the arm 50. FIG. 15 illustrates an arm portion 52 of the arm 50. FIG. 16 illustrates an example of the fixed outer jaw 56. FIG. 17 illustrates a right hand side (RHS) of a saddle portion 59. FIG. 18 shows the inner moving jaw portion 57. When assembled, the arm portion 52 feeds into the top tube 58 at one end with the moving jaw 57 feeding also into the top tube 58 on the same end as the arm portion 52. Also in this region is the threaded plate and fastener. The fixed jaw 56 feeds into the top tube 58 on an opposing end to the arm portion 52. The RHS saddle 59 and a LHS saddle (not shown) then fit over the assembly linking the various parts together and providing extra strength.

50=arm, 51=coupling, 52=arm portion, 53=distal end, 54=360 mm I-beam, 54a=255 I-Beam, 55=flanges, 56=fixed outer jaw, 57=moving inner jaw, 58=top tube, 59=saddle RHS, 61=threaded plate, 62=bolt M16x80.

Example 5

In this example, a method of assembly of a support element to a support structure is described.

Figure 19:
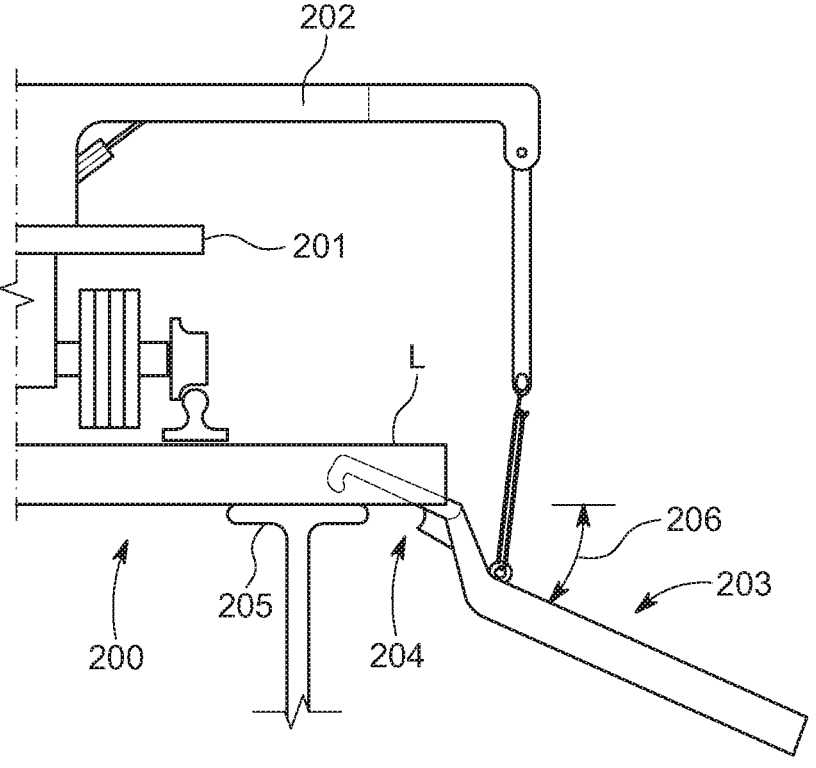
FIG. 19 illustrates a schematic drawing of a support element that has been coupled to a structural member (a bridge) being partly raised from a coupled and declined position towards a horizontal plane position.

Referring first to FIG. 19, a method of assembly is illustrated. The structural member 200 in this example is a railway bridge and, on the bridge/rails, is a truck 201 with a lifter crane 202. The truck 201 and any people (not shown) involved in the installation work stand on the bridge 200 and not on the bridge 200 edge or under the bridge 200.

The crane 202 is connected to a support element/arm 203 at a coupling 204 along the arm 203 length. The arm 203 jaw 204 is fitted to an beam 205 (the structural member) on the bridge 200 structure while the support element 203 is on an angle 206. In this example, the support element 203 is in a declined position i.e. pointing downwards from the coupling 204 point. Equally, the support arm 203 may be located in an inclined position pointing upwards of the coupling 204. The coupling 204 is maneuvered into position over the beam 205 of structural member 200 and the support element 203 then rotated up in the case of FIG. 19 (or down if initially in an inclined position) until the coupling 204 engages and the coupling jaws (not shown) bear on the structural member 200 to prevent further rotation, this point corresponding to a substantially horizontal plane position of the support element 203.

Figure 20:
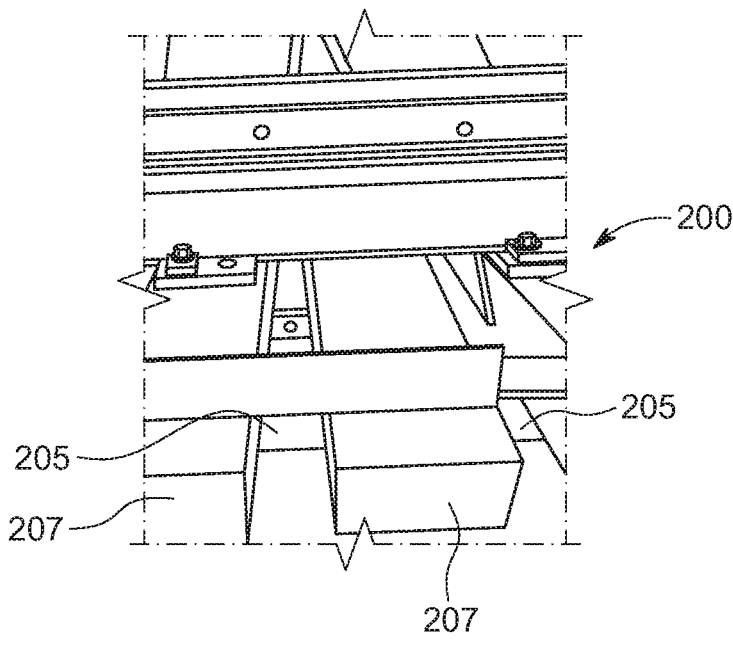
FIG. 20 illustrates a perspective side view of a railway bridge section to which the support element is to be installed via the method shown in FIG. 19.
Figure 21:
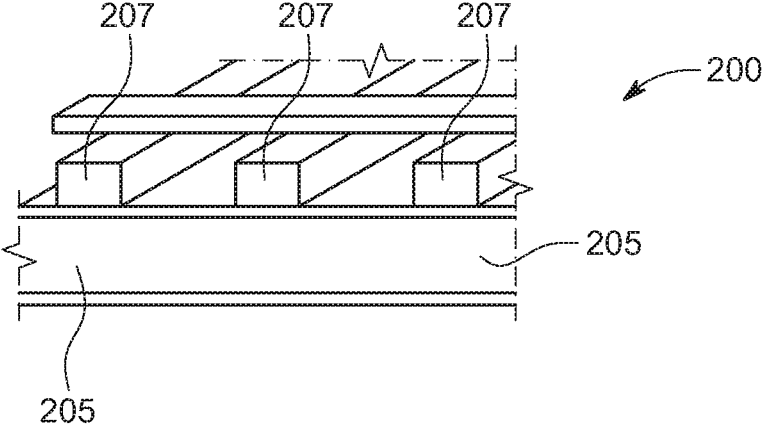
FIG. 21 illustrates a further side perspective view of the railway bridge of FIG. 20.
Figure 22:
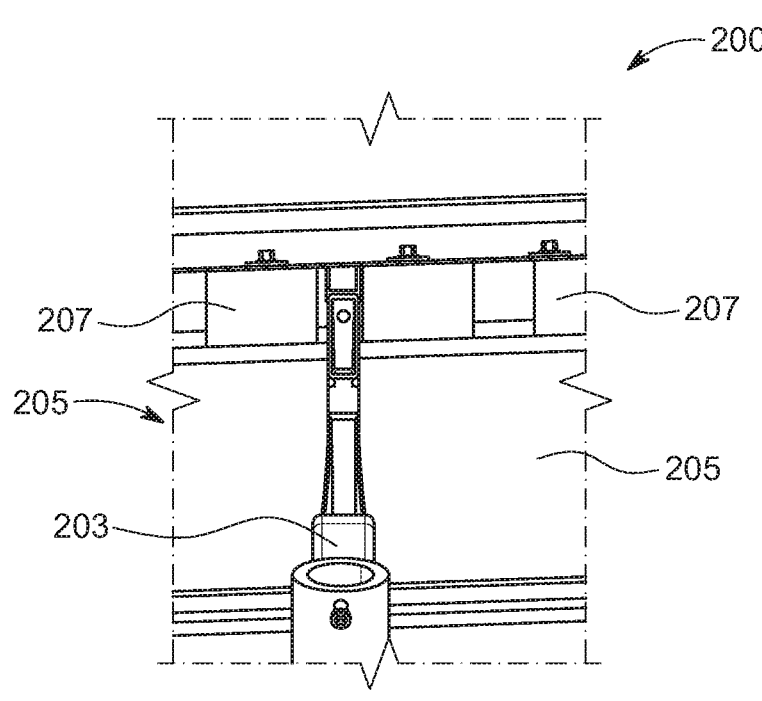
FIG. 22 illustrates a further side perspective view of the railway bridge of FIG. 20 with a support element installed.

FIG. 20 and FIG. 21 show the railway bridge 200 absent the support element 203 to provide a better view of the way the bridge 200 is formed and location of the beams 205 accessible between the railway sleepers 207. FIG. 22 shows a support element 203 installed onto a beam 205 extending outwards from the beam 205, the arm 203 coupling 204 located between the sleepers 207 and over the beam 205.

Once in a horizontal alignment, it is possible to fasten the support element 203 to the beam 205 as may be needed to provide greater rigidity. This may be completed from above the structural member 200 and without need to lean over far if at all from the railway bridge 200 side.

Multiple support elements 203 may be fitted (not shown) and a platform (not shown) placed over the support elements 203 to form a support structure (not shown). This support structure may in effect act as an extension of the bridge 200 width and through design, be used to carry items on it such as people, services, cargo and so on.

As may be appreciated, the above method of assembly may be reversed to allow simple removal of the support elements 203 and other parts as well.

200—bridge, 201 truck, 202 crane, 203 support element, 204 coupling, 205 beam, 206 angle, 207 sleeper

Example 6

As noted, the support element and support structure may be used on a variety of structural members.

Figure 23:
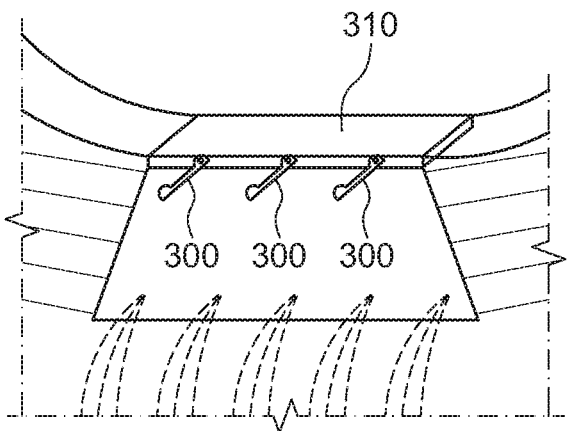
FIG. 23 illustrates a schematic drawing of a traffic bridge with support elements installed on one side of the traffic bridge.

FIG. 23 illustrates schematically a series of support elements 300 extending orthogonally from the side of a road bridge 310. This application may be used for example to extend the bridge width to convey pedestrians or service lines e.g. a water line over the bridge.

Figure 24:
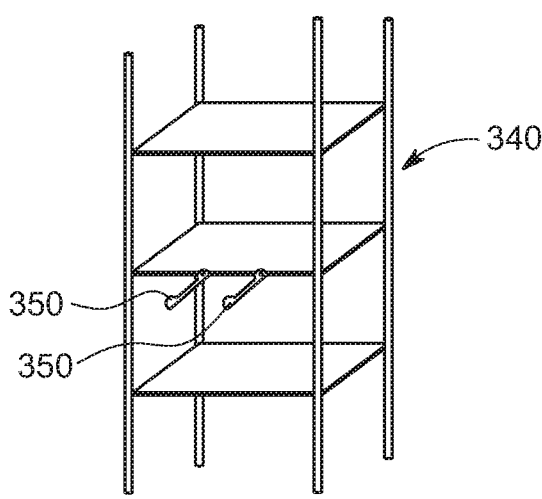
FIG. 24 illustrates a building skeleton of interlinked beams and two support elements coupled to a beam in the building skeleton.
Figure 25:
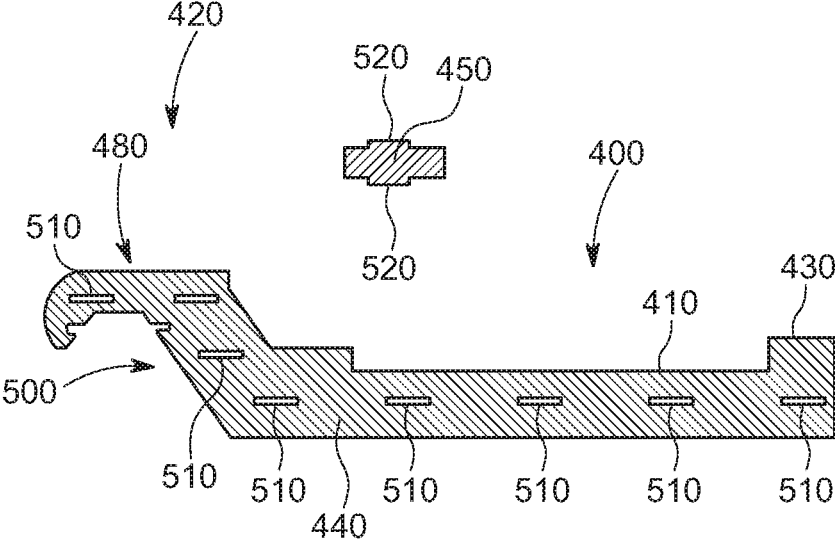
FIG. 25 illustrates a side view of a fourth embodiment of support element.
Figure 26:
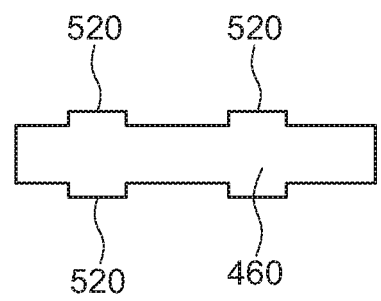
FIG. 26 illustrates a plan view of a first smaller insert.
Figure 27:
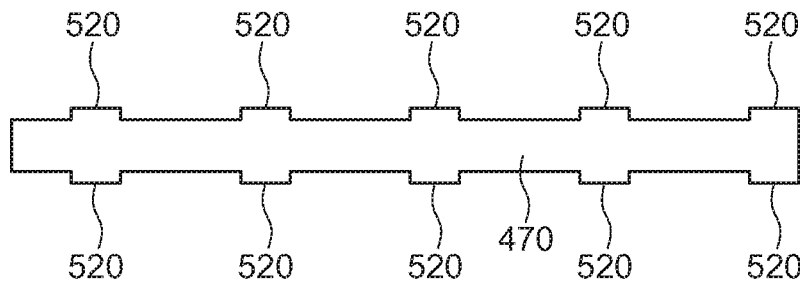
FIG. 27 illustrates a plan view of a second larger insert.

FIG. 24 schematically shows the skeleton structure 340 of a multi-storey building, in this case, the skeleton manufactured from steel beams welded together. Support elements 350 may be used to create a temporary or permanent platform from a steel beam or beams in the skeleton structure.

The platform may be used for example as a platform for workers to complete construction work on the building.

300—support elements, 310—road bridge, 340 building skeleton, 350 support element on the building

Example 7

In this example a further embodiment of support element is described with reference to FIGS. 25 to 28. In this embodiment, the support element 400 retains the overall shape of earlier embodiments with an arm 410, a coupling end 420 and a distal end 430. The support element 400 is manufactured from 10 mm thick steel plate cut into side or external sections 440 shown in FIG. 25 and internal brace sections 450, 460, 470 shown in the inset of FIG. 25, FIG. 26 and FIG. 27.

The internal brace sections 450, 460, 470 bridge a span between the side or external sections 440, with the internal brace sections being positioned in a substantially horizontal plane.

Figure 28:
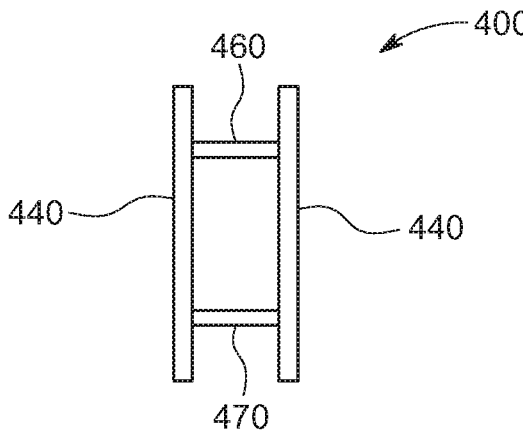
FIG. 28 illustrates an end view of an assembled fourth embodiment of support element.

To accommodate the desired positions of the internal brace sections 450, 460, 470, the internal brace sections 450, 460, 470 have different lengths. The internal brace section 460 of FIG. 26 for example has a length and two sets on either side of teeth or protrusions 520 that mate with complementary openings 510 in the external sections 430 about the jaw top 480. A longer internal brace 470 spans the distance along the arm portion 410 itself of the support element 400, in the example shown having five sets of teeth 520 however, the number of teeth 520 (and complementary openings 510 in the external brace 440) may be varied as desired. Intermediate 500 the jaw top 480 internal brace 460 and longer internal brace 470 is a shorter internal brace 450 shown in FIG. 25, in this case having a single set of teeth 520 that mate with complementary openings 510 in the external braces 440. FIG. 28 illustrates a partial end view of the support element 400 when assembled showing the external sections 440 on either side and the internal bracing 450, 470 (note the intermediate brace 460 is omitted from FIG. 28) between the external sections 440.

The internal braces 450, 460, 470 and external sections 440 may be fastened or welded together. Welding in this case may be advantageous as a butt weld linking the teeth 520 and external plate openings 510.

400 Support element, 410 arm, 420 coupling end, 430 distal end, 440 external sections, 450 shorter internal brace, 460 jaw top internal brace, 470 longer internal brace, 480 jaw top, 500 intermediate region, 510 plate openings, 520 teeth.

Aspects of the support element, support structure and related methods of assembly have been described by way of example only and it should be appreciated that modifications and additions may be made thereto without departing from the scope of the claims herein.

What is claimed is:

1. A support element comprising:
   an elongated shape,
   a distal end,
   a coupling end, and
   a cantilever form,
   wherein the coupling end of the support element comprises opposing jaws, the opposing jaws clamping together to secure the support element to a structural member, the structural member being a beam,
   wherein the support element is configured to rotate once coupled from an inclined position or a declined position to a substantially horizontal plane,
   wherein the support element, once rotated to said substantially horizontal plane, extends orthogonally away from the structural member to a termination point about the distal end of the support element,
   wherein the structural member or part thereof is a flanged beam with a flange and the support element comprises a C-shape cross-section form with a top jaw and an opposing lower jaw and, when coupled to the flange of the flanged beam, the top jaw extends over the flange of the flanged beam to grip or bear on a far side or portion of the flanged beam, and wherein the opposing lower jaw extends under a near side of the flange of the flanged beam.

2. The support element as claimed in claim 1, wherein the support element is a cantilever arm.

3. The support element as claimed in claim 1, wherein the structural member comprises a flanged top.

4. The support element as claimed in claim 1, wherein the structural member comprises a wider cross-section top and narrow cross-section body about which the opposing jaws clamp.

5. The support element as claimed in claim 1, wherein the structural member is a flanged beam on a bridge, building or scaffold.

6. The support element as claimed in claim 1, wherein rotational movement of the support element stops when the opposing lower jaw bears on the flange of the flanged beam and, in concert with the opposing lower jaw interfering with the flange of the flanged beam, the top jaw also interferes with or bears on the flange of the flanged beam.

7. The support element as claimed in claim 1, wherein the opposing jaws cooperate to allow rotational movement of the support element once coupled to the structural member up to a point and then, beyond this point, the opposing jaws act as a stop to prevent further rotational movement of the support element relative to the structural member.

8. A plurality of support elements comprising:
a plurality of support elements installed in series alongside a structural member to form a support structure alongside the structural member,
wherein each support element of the plurality of support elements comprises
an elongated shape,
a distal end,
a coupling end, and
a cantilever form,
wherein the coupling end of the each support element comprising opposing jaws, the opposing jaws clamping together to secure the each support element to said structural member, the structural member being a beam,
wherein the each support element is configured to rotate once coupled from an inclined position or a declined position to a substantially horizontal plane,
wherein the each support element once rotated to said substantially horizontal plane, extends orthogonally away from the structural member to a termination point about the distal end of the each support element,
wherein the structural member or part thereof is a flanged beam with a flange and each support element of the plurality of support elements comprises a C-shape cross-section form with a top jaw and an opposing lower jaw and, when coupled to the flange of the flanged beam, the top jaw extends over the flange of the flanged beam to grip or bear on a far side or portion of the flanged beam, and wherein the opposing lower jaw extends under a near side of the flange of the flanged beam.

9. The plurality of support elements as claimed in claim 8, wherein the each support element is a cantilever arm.

10. The plurality of support elements as claimed in claim 8, wherein the structural member comprises a flanged top.

11. The plurality of support elements as claimed in claim 8, wherein the beam comprises a wider cross-section top and narrow cross-section body about which the opposing jaws clamp.

12. The plurality of support elements as claimed in claim 8, wherein the structural member is a flanged beam on a bridge, building or scaffold.

13. The plurality of support elements as claimed in claim 8, wherein the support structure comprises at least one platform member.

14. The plurality of support elements as claimed in claim 13, wherein the at least one platform member is selected from: grating, plate, beams, battens, trays, and combinations thereof, located on some or all of the plurality of support elements.

15. A structural member and associated support structure alongside the structural member, comprising:
at least one support element, wherein each support element of the at least one support element comprises
an elongated shape,
a distal end,
a coupling end, and
a cantilever form,
wherein the coupling end of the at least one support element comprising opposing jaws, the opposing jaws clamping together to secure the at least one support element to the structural member, the structural member being a beam,
wherein the at least one support element is configured to rotate once coupled from an inclined position or a declined position to a substantially horizontal plane,
wherein the at least one support element once rotated to said substantially horizontal plane, extends orthogonally away from the structural member to a termination point about the distal end of the at least one support element,
wherein the structural member or part thereof is a flanged beam with a flange and the at least one support element comprises a C-shape cross-section form with a top jaw and an opposing lower jaw and, when coupled to the flange of the flanged beam, the top jaw extends over the flange of the flanged beam to grip or bear on a far side or portion of the flanged beam, and wherein the opposing lower jaw extends under a near side of the flange of the flanged beam.

16. The structural member and associated support structure as claimed in claim 15, wherein the structural member comprises a flanged top.

17. The structural member and associated support structure as claimed in claim 15, wherein the structural member comprises a wider cross-section top and narrow cross-section body about which the opposing jaws clamp.

18. The structural member and associated support structure as claimed in claim 15, wherein the structural member is a flanged beam on a bridge, building or scaffold.

19. The structural member and associated support structure as claimed in claim 15, wherein the associated support structure further comprises a platform located on the at least one support element.

20. The support element as claimed in claim 1, wherein the support element is a single-piece cantilever arm with integral jaws.

21. The support element as claimed in claim 1, wherein the opposing jaws are actuated from above the flange so that the support element is attached from above the structural member configured to avoid access of the structural member from under the structural member or from an edge of the structural member during installation of the support element.

22. The support element as claimed in claim 1, wherein the opposing jaws are initially spaced to permit the support element to pivot from an inclined or declined position towards a substantially horizontal plane, and are then tightened to lock the support element in place when it reaches the substantially horizontal plane, such that installation of the structural element is performed from above the structural member configured to avoid access of the structural member from under the structural member or from an edge of the structural member during installation of the support element.

23. The plurality of support elements as claimed in claim 8, wherein rotational movement of each support element stops when the opposing lower jaw bears on the flange of the flanged beam and, in concert with the opposing lower jaw interfering with the flange of the flanged beam, the top jaw also interferes with or bears on the flange of the flanged beam.

24. The plurality of support elements as claimed in claim 8, wherein each support element is a single-piece cantilever arm with integral jaws.

25. The plurality of support elements as claimed in claim 8, wherein the opposing jaws of each support element are actuated from above the flange so that each support element is attached from above the structural member configured to avoid access of the structural member from under the structural member or from an edge of the structural member during installation of the support element.

26. The plurality of support elements as claimed in claim 8, wherein the opposing jaws of each support element are initially spaced to permit the each support element to pivot from an inclined or declined position towards a substantially horizontal plane, and are then tightened to lock the each support element in place when it reaches the substantially horizontal plane, such that installation of the structural element is performed from above the structural member configured to avoid access of the structural member from under the structural member or from an edge of the structural member during installation of the support element.

27. The structural member and associated support structure as claimed in claim 15, wherein rotational movement of the at least one support element stops when the opposing lower jaw bears on the flange of the flanged beam and, in concert with the opposing lower jaw interfering with the flange of the flanged beam, the top jaw also interferes with or bears on the flange of the flanged beam.

28. The structural member and associated support structure as claimed in claim 15, wherein the at least one support element is a single-piece cantilever arm with integral jaws.

29. The structural member and associated support structure as claimed in claim 15, wherein the opposing jaws of the at least one support element are actuated from above the flange so that the at least one support element is attached from above the structural member configured to avoid access of the structural member from under the structural member or from an edge of the structural member during installation of the support element.

30. The structural member and associated support structure as claimed in claim 15, wherein the opposing jaws of the at least one support element are initially spaced to permit the each support element to pivot from an inclined or declined position towards a substantially horizontal plane, and are then tightened to lock the each support element in place when it reaches the substantially horizontal plane, such that installation of the structural element is performed from above the structural member configured to avoid access of the structural member from under the structural member or from an edge of the structural member during installation of the support element.

* * * * *